UNITED STATES PATENT OFFICE.

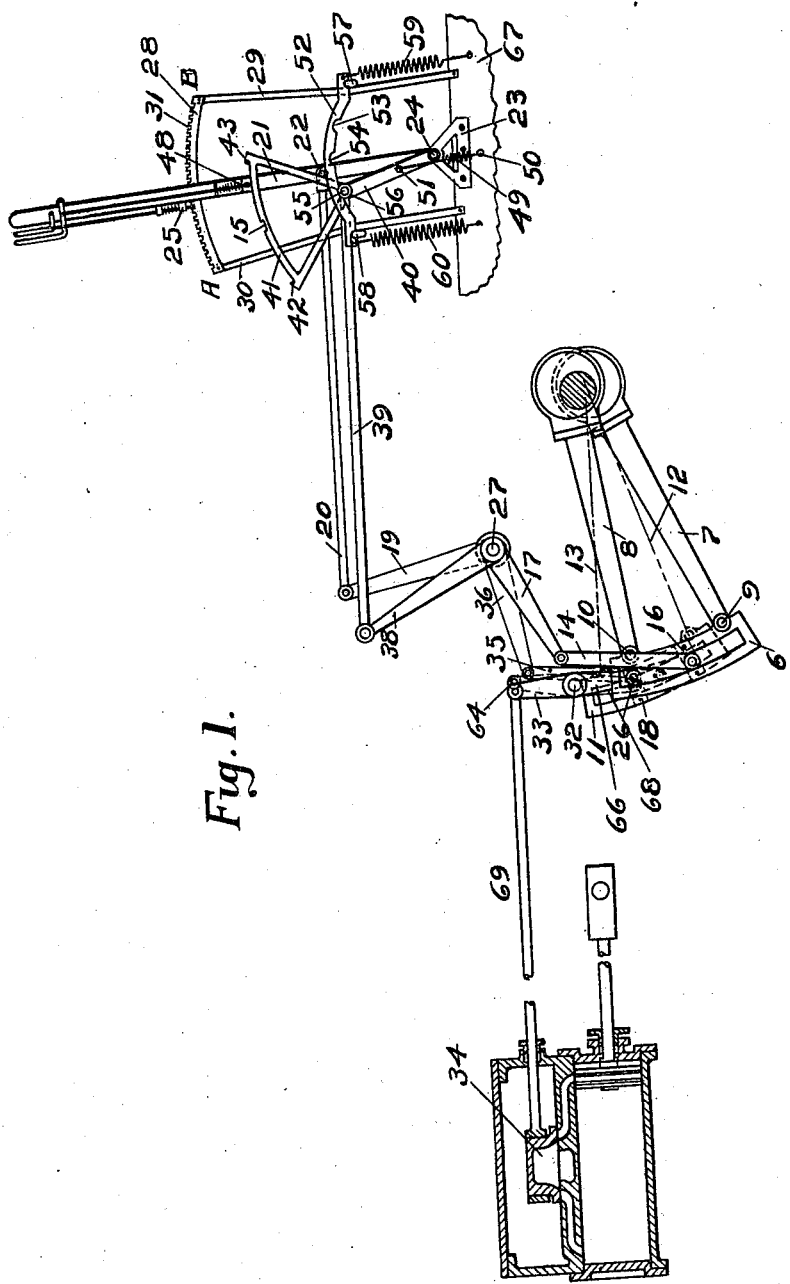

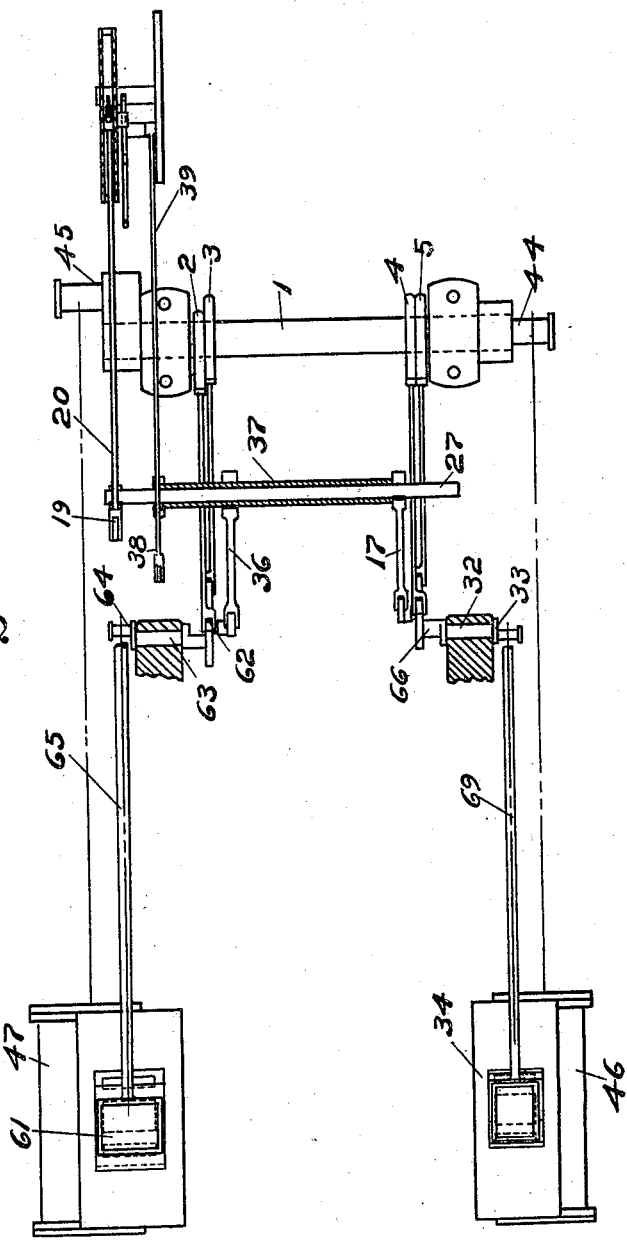

THEODORE C. SEWELL, OF PORTLAND, OREGON.

VALVE-GEAR.

983,843.
Specification of Letters Patent.
Patented Feb. 7, 1911.

Application filed February 24, 1910. Serial No. 545,766.

*To all whom it may concern:*

Be it known that I, THEODORE C. SEWELL, a citizen of the United States, residing at Portland, in the county of Multnomah and State of Oregon, have invented certain new and useful Improvements in Valve-Gear, of which the following is a specification.

This invention relates to valve gear for multiple cylinder steam engines and is intended more particularly for compound engines and the object of the invention is to provide simple and efficient means for changing the travel of the steam valves so as to produce an early or late cut-off, and further to provide means whereby with one operating lever the engineer can change the travel of one steam valve and thus produce an early or late cut-off in one cylinder without changing the other, and further to provide an interlocking device so that the valve will operate in unison when desired. This is especially desirable on compound locomotive engines where it is desirable to use a short travel and early cut-off on a high pressure cylinder and a full travel and late cut-off on the low pressure cylinder.

With these objects in view the invention consists of certain novel details of construction and combination of parts hereafter more fully described and pointed out in the claims.

Reference may be had to the accompanying drawings forming a part of the specification in which—

Figure 1 is an elevation with a sectional view of the steam valve. Fig. 2 is a plan view.

Referring now to the drawings 1 designates a crank shaft of a two cylinder engine which is provided with cranks 44 and 45 and which are connected to two steam cylinders 46 and 47 respectively by ordinary suitable connections. The steam cylinders 46 and 47 are of a common type and are provided with steam valves 34 and 61 respectively, which are of the common slide type and each is operated by a separate valve gear mechanism which is known as the link type, and for the operation thereof, I provide two pairs of eccentrics which are mounted on the crank shaft 1, one pair consisting of the members 2 and 3 and the other of members 4 and 5. The link 6 is of a common type and is operatively connected to the two eccentrics 4 and 5 by suitable connecting rods 7 and 8 which are provided with suitable pivot bearings 9 and 10 respectively.

The link 11 is connected to the eccentrics 3 and 4 by suitable connecting rods of which I only show the center lines 12 and 13 thereof, and it is to be understood that these connecting rods are of the ordinary types and similar to the connecting rods 7 and 8.

In order to provide means for changing the position of the link 6 and also for holding it in any desired position, I provide a hanger 14 which is pivotally connected thereto by a suitable saddle 16. The hanger 14 is also pivotally connected to a lifting arm 17 which is rigidly mounted on a rotatable shaft 27 which is also mounted on the arm 19 to which is pivotally connected one end of the reverse rod 20 and the other end of the reverse rod 20 is connected to the reverse lever 21 at 22. The reverse lever 21 is provided with a suitable pivot connection at 24 and is adapted to be operated through the arc A—B of the quadrant 28. The quadrant 28 is provided with suitable brackets 29 and 30 which securely fasten it to the frame work of the machine and is provided with a plurality of notches 31.

In order to secure the reverse lever 21 in any position in the arc A—B, I provide thereon a latching device 25 which is adapted to engage any one of the notches 31 in the quadrant 28 and thereby hold the lever 21 in any desired position. For operatively connecting the link 6 with the steam valve 34, I provide a rocker 66 which is rigidly mounted on the rocker shaft 32 and is operatively connected with the link 6 by a link block 18. The rocker 33 is also mounted on the rocker shaft 32 and is operatively connected to the valve 34 through a suitable connection 69. The link 11 is operated by a hanger 35 which is pivotally connected to the arm 36 which is rigidly mounted on a sleeve 37. The sleeve 37 is rotatably mounted on the shaft 27 and is provided with an arm 38 which is rigidly mounted thereon and which is pivotally connected to one end of the reverse rod 39. The other end of the reverse rod 39 is pivotally connected to a lever 40 which is pivotally attached to the bracket 23 and concentric with the pivot point of the lever 21. The upper end of the lever 40 is provided with a quadrant, which has projections 42 and 43 at each end thereof and is provided with a notch 15 in the center thereof. The object of the notch is to provide means for interlocking the levers 21 and 40 so that they may be operated together in a parallel position, and to accomplish this I provide a second latching device 48 on the lever 21 which is adapted to engage the notch 15 and thereby hold the two levers parallel. The latch 48 is also adapted to engage the projections 42 and 43 on the lever 40, so that when the movement of the lever 21 in any one direction exceeds the quadrant 41, it will carry the lever 40 with it through any further movement in that direction. When the central notch 15 in the quadrant 41 is disconnected from the lever 21 it is desirable to have it remain either in the forward, central or backward position, and for this purpose I provide a spring actuated locking device consisting of a quadrant 52 which is loosely mounted on the members 29 and 30 and held in position by lugs 51 and 58 which engage suitable projections thereon. In the quadrant 52 I provide three semicircular notches 52, 54 55 which are adapted to engage the roller 56 which is rotatably mounted on the lever 40 which is to provide means for holding the lever 40 at either forward, central or rearward position. The quadrant 52 is held against the lugs 57 and 58 by yielding springs 59 and 60, but is capable of being lifted therefrom by a predetermined angular pressure on the roller 56.

In order that the lever 40 may be brought to either forward or rearward position from either side of its central position, I provide an eccentric spring mechanism consisting of a spring 49 which is attached to the lever 40 at 51 and to the machine frame 67 at 50, which is on a line passing through the pivot points 24 and a central portion of the arc 52 so that if the lever 40 happens to be released between the center notch 54 and the end notch 53, it will be moved to the notch 53 by the tension of the spring 49 and in case it is released between the notch 54 and 55 in the same way it will be moved to the notch 55.

For operatively connecting the link 11 with the steam valve 61, I provide a rocker 68 which is mounted on the rocker shaft 63 upon which is also mounted the rocker arm 64. The rocker arm 64 is connected to the steam valve 61 through the valve stem 65.

The movement and travel of the steam valve 34 depends upon the position of the link 6. It is evident that if the link 6 be raised the pivot point 26 of the rocker 66 will approach the center thereof and the travel of the valve will be decreased, and if the link be raised still further so that the pivot point 26 passes the center thereof, the movement will be reversed and the valve will reach its maximum travel in the opposite direction in the lower end of the link and in the same way the travel of the valve 61 depends upon the position of the link 11. When it is desired to have the two valves move in unison at all times, the lever 40 is connected to the lever 21 by a latching device 48 engaging the notch 15 so that any movement of the lever 21 will have the same effect on both the valves, but when it is desired to change the travel of the valve 34 without changing the travel of the valve 61 the lever 40 is moved to the desired forward or backward position by the lever 21 and disconnected therefrom, and will be held in this first position by the arc 52 engaging the roller 56 thereon. The link 6 may now be moved up or down and thus the travel of the valve 34 changed without affecting the travel of the valve 61 except in case the lever 21 should be moved past the central point of the arc A—B. After the lever passes the central point of the arc A—B, it will engage the projections 42 or 43 on the arc 41 and carry the lever 40 with it, which is to provide means whereby the travel of steam valve 34 in the cylinder 46 cannot be fully reversed without changing the travel of the valve 61, so that one cylinder cannot be worked in opposition to the other.

Having thus described my invention I claim—

1. In combination, two steam valves, a separate link gear for operating each of said valves, a main lever for controlling the travel of one of the said valves, an auxiliary lever for controlling the travel of the other valve, means for interlocking the two said levers so that the said auxiliary lever may be operated by the said main lever, substantially as shown.

2. In combination, two steam valves, a separate link gear for operating each of said valves, a main lever for controlling the travel of one of the said valves, an auxiliary lever for controlling the travel of the other valve, means for interlocking the two said levers so that the said auxiliary lever may be operated by the said main lever, means on the said main lever for automatically engaging said auxiliary lever so as to prevent a reverse motion in one of the said valves without making a predetermined change in the travel in the other, substantially as shown.

3. In combination two steam valves, a separate link gear for operating each of said valves, a main lever for controlling the travel of one of the said valves, an auxiliary lever for controlling the travel of the other valve, means for interlocking the two said levers so that the said auxiliary lever may be operated by the said main lever, means on the said main lever for automatically engaging said auxiliary lever so as to prevent a reverse motion in one of the said valves without making a predetermined change in the travel in the other, a spring actuated locking device for holding the said auxiliary lever in a predetermined position, substantially as shown.

4. In combination, two steam valves, a separate link gear for operating each of said valves, each of said link gears operated by a pair of eccentrics, a main lever adapted to control the travel of one of the said valves, an auxiliary lever adapted to control the travel of the other said valve, said auxiliary lever pivoted concentric with the said main lever and provided with a quadrant having projections at each end thereof, and a notch in the center thereof, the said main lever provided with a latching device for automatically engaging either of the projections on the said auxiliary lever and adapted to engage the central notch thereof, a quadrant provided with notches for locking said main lever, brackets for holding said quadrant, a second quadrant, spring mounted on said brackets and provided with semicircular notch at each end and in the center thereof, a roller on said auxiliary lever adapted to engage said semi-circular notch, a spring eccentrically connected to said auxiliary lever, substantially as shown.

5. In combination, a high pressure steam valve, a low pressure steam valve, a separate link gear for operating each of said valves, each of said link gears operated by a pair of eccentrics, a main lever adapted to control the travel of said high pressure valve, an auxiliary lever adapted to control the travel of the said low pressure valve, said auxiliary lever pivoted concentric with the said main lever and provided with a quadrant having projections at each end thereof, and a notch in the center thereof, the said main lever provided with a latching device for automatically engaging either of the projections on the said auxiliary lever and adapted to engage the central notch thereof, a quadrant provided with notches for locking said main lever, brackets for holding said quadrant, a second quadrant, spring mounted on said brackets and provided with semicircular notch at each end and in the center thereof, a roller on said auxiliary lever adapted to engage said semi-circular notches, a spring eccentrically connected to said auxiliary lever, substantially as shown.

In testimony whereof I affix my signature in presence of two witnesses.

THEODORE C. SEWELL.

Witnesses:
 FRANK W. WALDEN,
 ARTHUR V. CALKINS.